United States Patent Office 3,793,224
Patented Feb. 19, 1974

3,793,224
CARBON MOLECULAR SIEVE CATALYSTS
Barry John Cooper, London, England, assignor to Johnson, Matthey & Co., Limited, London, England
No Drawing. Filed Dec. 10, 1970, Ser. No. 97,043
Claims priority, application Great Britain, Dec. 12, 1969, 60,743/69
Int. Cl. B01j *11/16*
U.S. Cl. 252—423                    4 Claims

ABSTRACT OF THE DISCLOSURE

A selective catalyst comprising a catalytically active material associated with molecular sieve carbon in such manner that the carbon prevents access to the catalytically active material of molecules having a size above a predetermined value. The catalyst is prepared by forming a dispersion of a catalytically active material in an aliphatic alcohol, polymerizing the alcohol to form a thermosetting polymeric resin and carbonizing the resin in an inert atmosphere.

---

This invention relates to catalysts and, more particularly, to catalysts which are selective or resistant to poisoning or both.

By "catalysts which are selective" is meant catalysts having the property, in the presence of substances between which certain reactions may be catalyzed, or catalyzing one or more of the reactions in preference to, or to the exclusion of, the others. Throughout this specification, this property will be referred to as "selectivity" and catalysts having this property will be described as "selective catalysts."

One way in which a selective catalyst may be prepared is to deposit catalytically active material within the pores of a support material having molecular sieve properties so as to form catalytically active sites within the pores. By molecular sieve properties of a support material is meant that the pores of the support are sufficiently small to prevent molecules above a certain size from entering them. The pores thus deny access to the active sites within the pores of certain sized molecules but permit molecules which are smaller than the pore size to reach the sites. The physical structure of the support material thus dictates which molecules in a given reaction system may reach the catalytically active sites within the material and therefore, which molecules may be available to take part in chemical reactions at these sites. The physical structure of the support material thus confers selectivity on the catalyst. Similarly, the physical structure of the support may protect the catalyst material within the pores from contact with large poison molecules which, if they could enter the pores, could reduce the activity of the catalyst to zero.

It is an object of this invention to provide a molecular sieve embodying a selective catalyst which may be readily prepared from commonly occurring materials, which is cheap to produce and which allows several alternate methods of production.

It has been determined that molecular sieve carbon (that is, carbon having molecular sieve properties) made, for example, by carbonizing organic material is eminently suitable for the preparation of selective catalysts.

According to a first feature of the present invention, a selective catalyst, as hereinbefore defined, comprises a catalytically active material associated with molecular sieve carbon in such a manner that the said carbon will prevent access to the catalytically active material of molecules having a size above a predetermined value.

According to further separate features of the invention:
(a) the molecular sieve carobn may be:
  (i) substantially amorphous;
  (ii) prepared by carbonizing organic materials and, preferably, polymerized organic materials;
(b) the catalytically active material may be:
  (i) deposited within the pores of the molecular sieve carbon;
  (ii) coated with a layer of molecular sieve carbon;
  (iii) deposited on a support, preferably a large area support, and the resulting supported catalyst coated with a layer of molecular sieve carbon.

A further feature of the invention includes a method of preparing a selective catalyst which comprises forming a dispersion of a catalytically active material in an aliphatic alcohol, polymerizing said alcohol to form a thermosetting polymeric resin and carbonizing said resin in an inert atmosphere.

The invention also includes a method of preparing a selective catalyst comprising depositing a catalytically active material on a support, polymerizing an alcohol to form a liquid polymer resin, coating the supported catalytically active material with a layer of said liquid resin and curing and carbonizing the resin coating in an inert atmosphere.

Preferably the catalytically active material consists of platinum and the dispersion of the catalytically active material may comprise an acidic solution of a salt of a desired catalytically active metal.

Certain methods are described in the following examples.

EXAMPLE 1

In this example, a method is described which has been used for preparing a selective catalyst in which the catalytically active material is deposited within the pores of amorphous molecular sieve carbon.

In general, the method comprises forming a dispersion of platinum in an aliphatic alcohol medium in the manner described in our British Pat. No. 1,147,563; polymerizing the alcohol and then curing and carbonizing the resultant polymer resin in an inert atmosphere.

In more detail, the method used was as follows:

1.2 g. of platinum oxide was weighed into a vessel, and the vessel flushed with nitrogen for 15 min., 30 ml. of furfuryl alcohol and 7 ml. of formaldehyde solution were added under a stream of nitrogen and the mixture stirred and warmed to 40° C. A further 5 ml. of formaldehyde solution were added, and the mixture left for ½ hour during which time the platinum oxide was completely reduced to colloidal platinum. At this stage another 5 ml. of formaldehyde solution were added and the suspension heated to 90° C. for ½ hour, following which 0.15 ml. of orthophosphoric acid solution (1 vol. $H_3PO_4$ to 2 vol. $H_2O$) were added. The suspension was kept at 90° C. for another hour, during which time partial polymerization to a viscous liquid occurred. The polymer was cured at 110° C. for 16 hours and at 200° C. for 6 hours under nitrogen. After crushing to form particles which would pass through a 2 mm. mesh, the particles were carbonized at 640° C. for 4 hours under oxygen-free nitrogen.

The resulting catalyst contained 5.72% by weight of platinum. However, by varying the quantity of platinum oxide used to produce the dispersion the concentration of platinum may be varied at will, though practical limits in the catalyst would probably be in the range 0.1%–20% platinum by weight. Further, the same method may also be used for the preparation of selective catalysts containing alloys of platinum and rhodium, containing up to 50% rhodium.

EXAMPLE 2

In this example, a method is described for the preparation of a selective catalyst comprising a supported catalyst coated with a layer of molecular sieve carbon.

In general, the method comprises forming a liquid polymer resin by polymerizing an alcohol; covering the supported catalyst with the liquid resin; allowing excess resin to drain away and, thereafter, curing and carbonizing the resin coating.

In more detail, the method used was as follows:

A reactor was flushed for 15 mins. under nitrogen and a solution containing 30 ml. furfuryl alcohol and 7 ml. formaldehyde (40% HCHO in water) added and warmed to 40° C. 5 ml. of formaldehyde solution was then added and the solution stirred for ½ hour when a further 5 ml. of formaldehyde solution were added and the whole heated to 90° C. for 1½ hours. Next, 0.15 ml. of orthophosphoric acid solution (1 vol. $H_3PO_4$) to 2 vol. $H_2O$) was added and heating continued at 90° C. for 1 hour. The hot liquid polymer was then poured over granules of a 2% Pt on charcoal catalyst which were then allowed to drain at 90° for 1 hour. The resin coating was then cured and the catalyst carbonized as described in Example 1.

The catalysts prepared in Examples 1 and 2 were found to be highly selective in hydrogenation reactions. Samples of the catalysts, for example, selectively hydrogenated linear olefinic molecules in a mixture of linear and branched chain olefins. The catalysts are also resistant to poisoning by large poison molecules such as molecules of sulphur compounds.

The results of these tests on the catalysts are summarized in Table 1.

TABLE 1.—THE HYDROGENATION OF LINEAR AND OF BRANCHED OLEFINS OVER CONVENTIONAL PLATINUM/CHARCOAL AND OVER PLATINUM/CARBON MOLECULAR SIEVES

| A. $1.78 \times 10^{-4}$ moles/pulse at 25° C. Reciprocal space velocity $9.0 \times 10^{-3}$ g. min./cm.$^3$ | | | B. $2.00 \times 10^{-4}$ moles/pulse at 30° C. Reciprocal space velocity $4.0 \times 10^{-4}$ g. min./cm.$^3$ | | |
|---|---|---|---|---|---|
| | Alkane produced (mole × $10^4$) | | | Alkane produced (mole × $10^4$) | |
| Olefin | Pt/CMS1 | 10% Pt/C | Olefin | Pt/CMS2 | 2% Pt/C |
| a. Propylene | 0.165 | 1.49 | b. Butene-1 | 0.22 | 1.77 |
| b. Butene-1 | 0.06 | 1.28 | c. Isobutene | 0.02 | 1.14 |
| c. Isobutene | 0 | 1.32 | e. 3,3-dimethylbutene-1 | 0.02 | 0.99 |
| d. 3-methylbutene-1 | 0 | 1.25 | | | |
| Selectivity, a/a+c | 1.0 | 0.53 | Selectivity, b/b+c | 0.92 | 0.61 |
| Selectivity, b/b+d | 1.0 | 0.51 | Selectivity, b/b+e | 0.92 | 0.64 |

NOTE.—See the following:

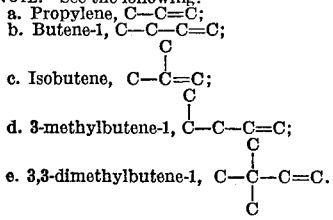

a. Propylene, C—C=C;
b. Butene-1, C—C—C=C;
c. Isobutene, C—C=C with C branch;
d. 3-methylbutene-1, C—C—C=C with C branch;
e. 3,3-dimethylbutene-1, C—C—C=C with C branches.

Other methods of preparation, such as adsorption of compounds containing catalytically active species from solution on to previously prepared molecular sieve carbon may also be employed. For example, such compounds as chloroplatinic acid, sodium chloropalladite, rhodium trichloride, ruthenium trichloride, may be adsorbed from an aqueous solution or any other solvent medium in which the salt is sufficiently soluble.

A further method of preparing carbon molecular sieve catalysts is to utilise an acidic solution of a salt of the desired catalytically active metal.

EXAMPLE 3

5 ml. of an aqueous solution of chloroplatinic acid (200 g./l. Pt) were added to 20 ml. of furfuryl alcohol and polymerization induced by slight warming. After the vigorous polymerization had ceased the solid polymer was removed from the reaction flask and dried by heating at 110° C. under nitrogen. The polymer was then cured at 200° C. for 16 hr. and carbonized at 650° C. for 4 hr., both under nitrogen.

Similar catalysts were prepared containing Fe, Co, Ni, Cu, Ru, Rh, Pd, Os and Ir ase the catalytic metal by adding aqueous solutions of the chlorides acidified with hydrochloric acid to furfuryl alcohol and then treating in the same manner as for the platinum catalyst.

A further method of preparation that may be used is the deposition of active materials from the gas phase. For example volatile salts such as anhydrous ferric chloride, aluminium chloride, copper chloride ($CuCl_2$) and tungsten chloride ($WCl_6$) may be sublimed on to the carbon.

EXAMPLE 4

Ferric chloride was successfully incorporated into a composite carbon molecular sieve (CCMS) by the following procedure.

The CCMS was first prepared by a method modified by coating an activated charcoal rather than a platinum/charcoal catalyst as in Example 2. The process of ferric chloride impregnation was as follows:

The CCMS and ferric chloride were placed in two zones of a tubular reactor heated by separate furnaces. The CCMS was then evacuated for 16 hrs. to a pressure less than $10^{-4}$ torr at temperatures between 250 and 400° C. The CCMS was cooled to room temperature and chlorine gas admitted to the reactor when the ferric chloride was heated to 250–400° C. causing sublimation of the salt on to the cold CCMS. After heating the CCMS at 250–400° C. for up to 24 hrs. the reactor was cooled, excess chlorine pumped off, and the catalyst removed.

Apart from the carbon molecular sieves being selective due to the relative size of the molecules it is believed that they are to some degree "shape selective." There is evidence that with the carbon molecular sieves the pores are shaped somewhat similar to letter boxes and as a result the said sieves exhibit a form of selectivity which it may not be possible to achieve with other molecular sieves. For example, with a carbon molecular sieve it is possible to select between branched aliphatic molecules and aromatic molecules which latter have a flat planar shape and thus more readily enter the "letter box" pore than would branched aliphatic molecules.

I claim:

1. A method of preparing a selecting catalyst which includes the steps of treating platinum oxide with furfuryl alcohol and formaldehyde solution in a stream of nitrogen for a period sufficient with slight heating to reduce said platinum oxide to colloidal platinum, adding orthophosphoric acid solution with additional heating to initiate polymerization of the alcohol, curing the polymer by heating to 110° C. for 16 hours and to 200° C. for 6 hours, crushing the resultant polymer to form small particles and carbonizing said particles at 640° C. for 4 hours, all of said steps being effected in an atmosphere of nitrogen.

2. A method of preparing a selective catalyst which includes the steps of warming a solution of furfuryl alcohol and formaldehyde gradually to a temperature of 90° C., adding orthophosphoric acid solution to said alcohol solution, whilst maintaining said temperature, to initiate polymerization, preparing granules of a platinum on charcoal catalyst, pouring the hot liquid polymer over said granules and allowing same to drain while maintaining the temperature of 90° C., curing the resin coating on said granules and carbonizing the same, all of said steps being effected in an atmosphere of nitrogen.

3. A selective catalyst prepared by the process of claim 1.

4. A selective catalyst prepared by the process of claim 2.

References Cited

UNITED STATES PATENTS

| | | | |
|---|---|---|---|
| 3,446,865 | 5/1969 | Roth et al. | 252—447 |
| 2,459,907 | 1/1949 | Winslow | 252—444 |
| 3,424,671 | 1/1969 | Kay | 208—Dig. 2 |
| 2,761,822 | 9/1956 | Addison | 23—209.2 |
| 3,201,330 | 8/1965 | Price | 23—209.1 |
| 3,198,714 | 8/1965 | Johnson et al. | 23—209.2 |
| 2,761,848 | 9/1956 | Bushong et al. | 23—209.1 |

FOREIGN PATENTS

| | | | |
|---|---|---|---|
| 660,296 | 3/1963 | Canada | 252—422 |
| 932,387 | 7/1963 | Great Britain | 252—444 |
| 1,138,307 | 1/1969 | Great Britain | 252—444 |
| 1,147,563 | 4/1969 | Great Britain | 252—430 |

DANIEL E. WYMAN, Primary Examiner

P. E. KONOPKA, Assistant Examiner

U.S. Cl. X.R.

117—46 CC, Dig. 11; 252—422, 441, 442, 447, 477 R; 260—683.9; 423—445